US009812685B2

(12) United States Patent
Nozaki et al.

(10) Patent No.: US 9,812,685 B2
(45) Date of Patent: Nov. 7, 2017

(54) BATTERY PACK FOR ELECTRIC VEHICLE

(71) Applicant: KAWASAKI JUKOGYO KABUSHIKI KAISHA, Kobe-shi, Hyogo (JP)

(72) Inventors: Takuma Nozaki, Aioi (JP); Kouichirou Sano, Himeji (JP); Katsunori Igaki, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 94 days.

(21) Appl. No.: 14/440,578

(22) PCT Filed: Nov. 16, 2012

(86) PCT No.: PCT/JP2012/007381
§ 371 (c)(1),
(2) Date: May 4, 2015

(87) PCT Pub. No.: WO2014/076740
PCT Pub. Date: May 22, 2014

(65) Prior Publication Data
US 2015/0280188 A1 Oct. 1, 2015

(51) Int. Cl.
H01M 2/10 (2006.01)
B60L 11/18 (2006.01)
(Continued)

(52) U.S. Cl.
CPC ............ *H01M 2/1083* (2013.01); *B60K 1/04* (2013.01); *B60L 11/1816* (2013.01);
(Continued)

(58) Field of Classification Search
CPC ............ B60K 1/04; B60K 2001/0455; B60K 2001/0466; H01M 2/1083; H01M 2/1077;
(Continued)

(56) References Cited

U.S. PATENT DOCUMENTS 6,219,249 B1* 4/2001 Tuccio ................... H05K 7/183
312/223.2
2012/0082875 A1* 4/2012 Watanabe ........... H01M 2/1077
429/71
(Continued)

FOREIGN PATENT DOCUMENTS

JP 2004148849 A 5/2004
JP 2004148852 A 5/2004
(Continued)

OTHER PUBLICATIONS

ISA Japanese Patent Office, International Search Report Issued in Application No. PCT/JP2012/007381, Jan. 22, 2013, WIPO, 2 pages.

*Primary Examiner* — Muhammad Siddiquee
(74) *Attorney, Agent, or Firm* — Alleman Hall Creasman & Tuttle LLP

(57) ABSTRACT

A battery pack comprises a plurality of batteries which store electric power for activating an electric utility vehicle; a battery case which accommodates the plurality of batteries therein; and an external frame unit which is provided on an outer surface of the battery case and supports the batteries from below, wherein the external frame unit includes a lower support section placed on a lower surface of the battery case, an upper support section placed on an upper surface of the battery case, and a coupling section which couples the lower support section and the upper support section to each other. This allows the battery case to ensure a required stiffness while providing insulation between the batteries and an outside of the batteries, without increasing a thickness of the battery case.

12 Claims, 9 Drawing Sheets

(51) Int. Cl.
*B60K 1/04* (2006.01)
*H01M 10/625* (2014.01)
*H01M 10/6563* (2014.01)

(52) U.S. Cl.
CPC ... *H01M 2/1077* (2013.01); *B60K 2001/0455* (2013.01); *B60K 2001/0466* (2013.01); *B60Y 2200/141* (2013.01); *B60Y 2200/23* (2013.01); *H01M 10/625* (2015.04); *H01M 10/6563* (2015.04); *H01M 2220/20* (2013.01)

(58) Field of Classification Search
CPC ........... H01M 2220/20; H01M 10/625; H01M 10/6563; B60L 11/1816; B60Y 2200/141; B60Y 2200/23
See application file for complete search history.

(56) References Cited

U.S. PATENT DOCUMENTS

| | | | | |
|---|---|---|---|---|
| 2012/0171527 A1* | 7/2012 | Hiroma | ................ | H01M 2/204 429/61 |
| 2012/0244398 A1* | 9/2012 | Youngs | ................ | B60K 6/28 429/61 |
| 2014/0193694 A1* | 7/2014 | Hoshi | ................ | H01M 2/1077 429/151 |

FOREIGN PATENT DOCUMENTS

| | | |
|---|---|---|
| JP | 2006198048 A | 8/2006 |
| JP | 2009083601 A | 4/2009 |

\* cited by examiner

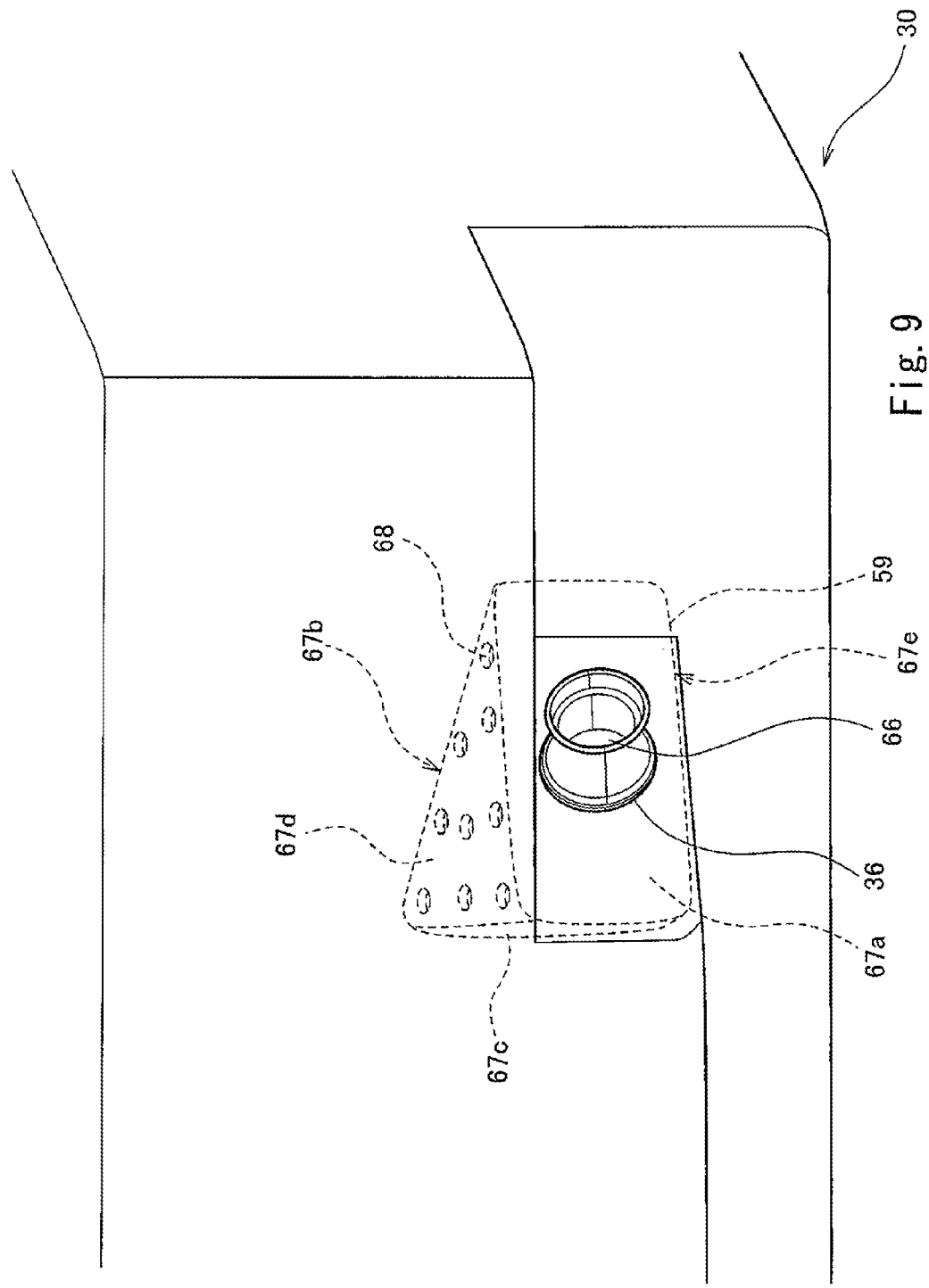

BATTERY PACK FOR ELECTRIC VEHICLE

TECHNICAL FIELD

The present invention relates to a battery pack for an electric vehicle which generates a rotational driving force for allowing the electric vehicle to drive with electric energy.

BACKGROUND ART

In recent years, for the purpose of environmental conservation, an electric vehicle which uses as a driving power source an electric motor activated with electric energy stored in a battery has been developed (e.g., Patent Literature 1). Specifically, Patent Literature 1 discloses an electric golf cart including a driving motor activated by the battery, an electric generator which charges the battery, a motor controller which controls the driving motor, and a CPU which controls the electric generator.

CITATION LIST

Patent Literature

Patent Literature 1: Japanese Laid-Open Patent Application Publication No. 2006-198048

SUMMARY OF INVENTION

Technical Problem

The battery of the above-described electric vehicle is mounted to the electric vehicle in such a manner that the battery is accommodated into a battery case (battery container). The battery case is required to have an insulation property. To this end, the battery case is formed of, for example, an insulating synthetic resin.

However, to allow the battery case to be lifted up and moved, the battery case is required to have a stiffness that is sufficient to withstand the weight of the battery. To increase the stiffness of the battery, the thickness of the battery case may be increased. Increasing the thickness of the battery case causes a need for a larger space inside the electric vehicle to mount the battery case.

Accordingly, an object of the present invention is to provide a battery pack for an electric vehicle with a battery container which can ensure required stiffness while providing insulation between a battery and an outside region, without increasing the thickness of the battery container.

Solution to Problem

To achieve the above-described object, the present invention provides a battery pack for an electric vehicle, comprising: a plurality of batteries which store electric power for activating the electric vehicle; a battery container which is made of an insulating resin and accommodates the plurality of batteries therein; and an external frame unit which is provided on an outer surface of the battery container and supports the battery from below, wherein the external frame unit includes a lower support section placed on a lower surface of the battery container, an upper support section placed on an upper surface of the battery container, and a coupling section which couples the lower support section and the upper support section to each other.

In this configuration, since the external frame unit is configured such that the upper support section is coupled to the lower support section via the coupling section, the battery container can be lifted up in a state in which the battery container is supported by the lower support section from below, for example, by lifting up the upper support section. For this reason, it is not necessary to excessively increase the stiffness of the whole battery container to prevent damage to the battery container when the battery container is lifted up for the purpose of, for example, replacement of the battery or the like. In other words, since it is not necessary to excessively increase the stiffness of the whole battery container, an increase in the thickness of the battery container may be prevented.

In addition, since the external frame unit is provided on the outer surface of the battery container, the battery container having an insulation property and the external frame unit supporting the battery container can be formed of different materials. Furthermore, the battery container can prevent electric contact between the external frame unit and the battery (charged component).

Therefore, the battery pack for the electric vehicle of the present invention allows the battery container to ensure the required stiffness while providing insulation between the batteries and an outside region, without increasing the thickness of the battery container.

In the battery pack for the electric vehicle of the present invention, in the above configuration, the upper support section of the external frame unit may include a mounting section used to removably mount a suspending unit for suspending the battery pack to the upper support section.

In this configuration, the suspending unit can be disconnected from the mounting section, when the suspending unit is not used. Therefore, it is not necessary to ensure a space in the electric vehicle in which the suspending unit is placed, and thus a space inside the electric vehicle can be efficiently utilized. Also, by using a plurality of mounting sections placed in proper locations, the battery pack for the electric vehicle can be lifted up stably by using the suspending unit.

In the battery pack for the electric vehicle of the present invention, in the above configuration, the external frame unit may include a fastening section attached with a fastening member used to fasten the external frame unit to a vehicle body frame of the electric vehicle.

In this configuration, since the external frame unit includes the fastening section, the battery container can be fastened to the vehicle body frame of the electric vehicle via the external frame unit. That is, instead of directly fastening the battery container accommodating the plurality of batteries to the vehicle body of the electric vehicle, the battery container is fastened to the vehicle body frame via the external frame unit. Therefore, the battery pack for the electric vehicle of the present invention can be stably mounted to the vehicle in a state in which the weight of the battery applied via the fastening section is not directly applied to the battery container.

In the battery pack for the electric vehicle of the present invention, in the above configuration, the battery container may have an opening which is in communication with an interior of the battery container and a lid section which closes the opening, in a region which is not covered with the external frame unit, and a service plug which cuts off an electric power supply from the battery placed in the interior of the battery container may be placed in a vicinity of the opening, in the interior of the battery container.

In this configuration, since the service plug is placed in the vicinity of the opening, the service plug can be operated as necessary by removing the lid section. Therefore, the battery pack for the electric vehicle of the present invention is capable of cutting off the electric power supply from the battery, as necessary, without a need to separate the external frame unit and the battery container from each other.

The battery pack for the electric vehicle of the present invention, in the above configuration, may comprise an internal frame unit which couples the plurality of batteries to each other to accommodate the batteries coupled to each other into the battery container, the internal frame unit may include a retaining section which couples the plurality of batteries to each other and retains the plurality of batteries coupled to each other, and a battery support section placed on a lower surface of a battery assembly including the plurality of batteries coupled to each other by the retaining section to support the battery assembly from below, and the battery support section may be in surface contact with a bottom surface of an interior of the battery container in a plurality of locations.

In this configuration, since the battery pack includes the internal frame unit including the retaining section and the battery support section, the plurality of batteries coupled to each other by the internal frame unit can be accommodated into the battery container. This makes it easy to perform the operation for accommodating the plurality of batteries into the battery container.

In addition, the battery support section of the internal frame unit is in surface contact with the bottom surface of the interior of the battery container in the plurality of locations. This allows the weight of the battery assembly supported by the battery support section to be applied to the battery container in a dispersed manner.

Advantageous Effects of Invention

As should be clearly understood from the above, in accordance with the present invention, the battery container can ensure required stiffness while providing insulation between the batteries and an outside region, without increasing the thickness of the battery container.

BRIEF DESCRIPTION OF DRAWINGS

FIG. 9 is a view showing a region which is in the vicinity of an air suction section included in the battery case, of the battery pack of FIGS. 3 and 4.

DESCRIPTION OF EMBODIMENTS

Now, the configuration of an electric utility vehicle (electric vehicle) 1 according to an embodiment of the invention will be described. Hereinafter, the stated directions are referenced from the perspective of a driver riding in the electric utility vehicle 1.

(Embodiment 1)
(Configuration of Electric Utility Vehicle)

Figure 1:
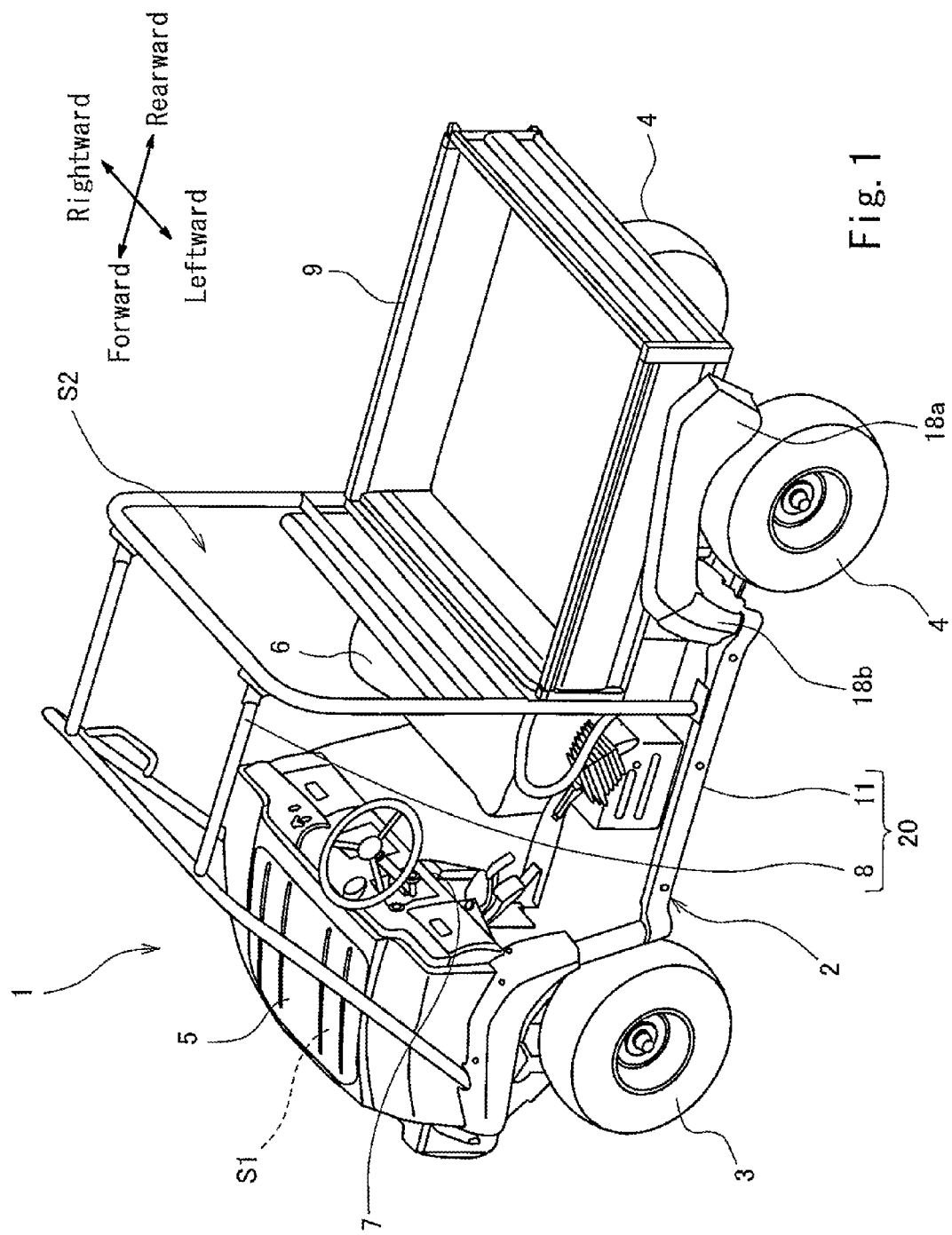
FIG. 1 is a perspective view showing an electric utility vehicle according to Embodiment 1 of the present invention.

FIG. 1 is a perspective view showing the electric utility vehicle 1 according to Embodiment 1 of the present invention. As shown in FIG. 1, the electric utility vehicle 1 is an electric vehicle which does not include an internal combustion engine, and generates a rotational driving force for activating wheels, with electric power supplied from an electric power supply unit which generates the electric power through a chemical reaction. The electric utility vehicle 1 includes a pair of right and left front wheels 3 in the front portion of a vehicle body 2, and a pair of right and left rear wheels 4 in the rear portion of the vehicle body 2. A front space S1 formed between the right and left front wheels 3 is covered with a hood 5 from above. A radiator 10 (see FIG. 2), or the like is placed within the front space S1. A seat 6 which is laterally elongated is placed rearward relative to the hood 5 and in the vicinity of the center of the vehicle body in a forward and rearward direction. The driver and a passenger can be seated on the seat 6. The vehicle body 2 is provided with a dash board 7 which defines the front space S1 and a riding space S2 in which the seat 6 is placed. As constituent members of a vehicle body frame 20, the vehicle body 2 is provided with a floor frame 11 extending from the right and left sides of the hood 5 to a location that is behind and below the seat 6, and a cabin frame 8 surrounding the riding space S2 in which the seat 6 is placed, over the floor frame 11.

The cabin frame 8 is constituted by metal cylindrical pipes and placed such that the riding space S2 opens forward, rearward, leftward, rightward, and upward. In other words, the vehicle body 2 does not include a door which allows the driver or the passenger to ride in and get off the electric utility vehicle 1. The vehicle body 2 is provided with a cargo bed 9 behind the riding space S2. The cargo bed 9 includes a bottom wall of a rectangular shape when viewed from above, and side walls protruding upward from the four sides of the bottom wall. The cargo bed 9 is opened upward. A first fender 18a is mounted to the cargo bed 9 to cover the rear wheels 4 from above. A second fender 18b which extends continuously to the front side of the first fender 18a is mounted to the floor frame 11. The cargo bed 9 can be banked manually or automatically such that its rear portion is made lower.

Figure 2:
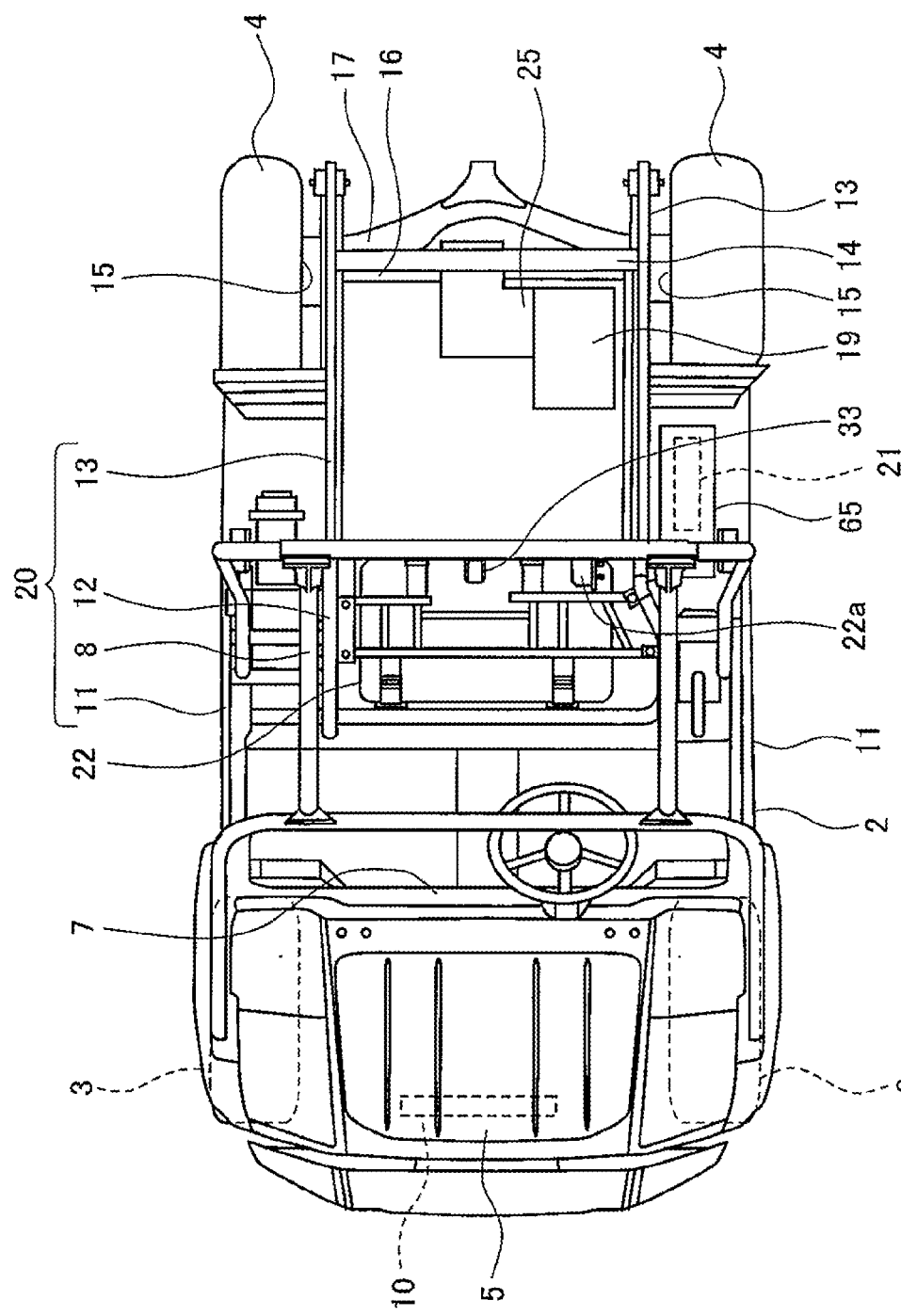
FIG. 2 is a plan view showing the electric utility vehicle of FIG. 1.

FIG. 2 is a plan view showing the electric utility vehicle 1 of FIG. 1. FIG. 2 shows a state in which the seat 6 and the cargo bed 9 (FIG. 1) are detached. As shown in FIG. 2, the vehicle body 2 includes seat frames 12 which are the constituent members of the vehicle body frame 20 and support the seat 6 (see FIG. 1) from below. The front end portions of a pair of right and left rear frames 13, which are the constituent members of the vehicle body frame 20 and extend in the forward and rearward direction, are connected to the seat frames 12, respectively. The rear frames 13 support the cargo bed 9 (see FIG. 1) from below. The rear end portions of the right and left rear frames 13 are connected to each other via a cross member 14 extending in a vehicle width direction. Axles 16 extending in the vehicle width direction are connected to the rear wheels 4, respectively. A coupling member 17 coupling hubs 15 of the right and left rear wheels 4 to each other extends in the vehicle width direction, in a location which is behind the axles 16.

The vehicle body 2 is provided with a motor unit 19 for activating the rear wheels 4 (front wheels 3 as well as the rear wheels 4, in four-wheel drive), a controller case 65 (battery unit) in which an inverter 21 for controlling the motor unit 19, and the like are accommodated, and a battery pack 22 which stores the electric power supplied to the inverter 21. The battery pack 22 includes a charging port 22a for connecting an outside charging connector (not shown) to the outer surface (upper surface) at a left side in the vehicle width direction.

The motor unit 19, the inverter 21, and the battery pack 22 are placed rearward relative to the dash board 7. Among these, the motor unit 19 and the inverter 21 are placed rearward relative to the cabin frame 8 and below the cargo bed 9 (see FIG. 1) covering the electric components from above. In contrast, the battery pack 22 is placed in a space surrounded by the seat frames 12, below the seat 6.

The electric utility vehicle 1 of the present embodiment is devised to increase the stiffness of the above battery pack 22. The configuration of the battery pack 22 will be described in detail later.

The inverter 21 is placed outward (in the present example, leftward) in the vehicle width direction relative to the front portion of the left rear frame 13. The motor unit 19 is placed rearward relative to the battery pack 22 and forward relative to the axles 16. The motor unit 19 is located at one side (in the present example, left side) in the vehicle width direction, in a region between the right and left rear frames 13, when viewed from above. The drive shaft (not shown) of the motor unit 19 protrudes in the vehicle width direction (in the present example, rightward). The motor unit 19 serves to transmit a driving force to the rear wheels via a gear box 25.

(Configuration of Battery Pack)

Figure 3:
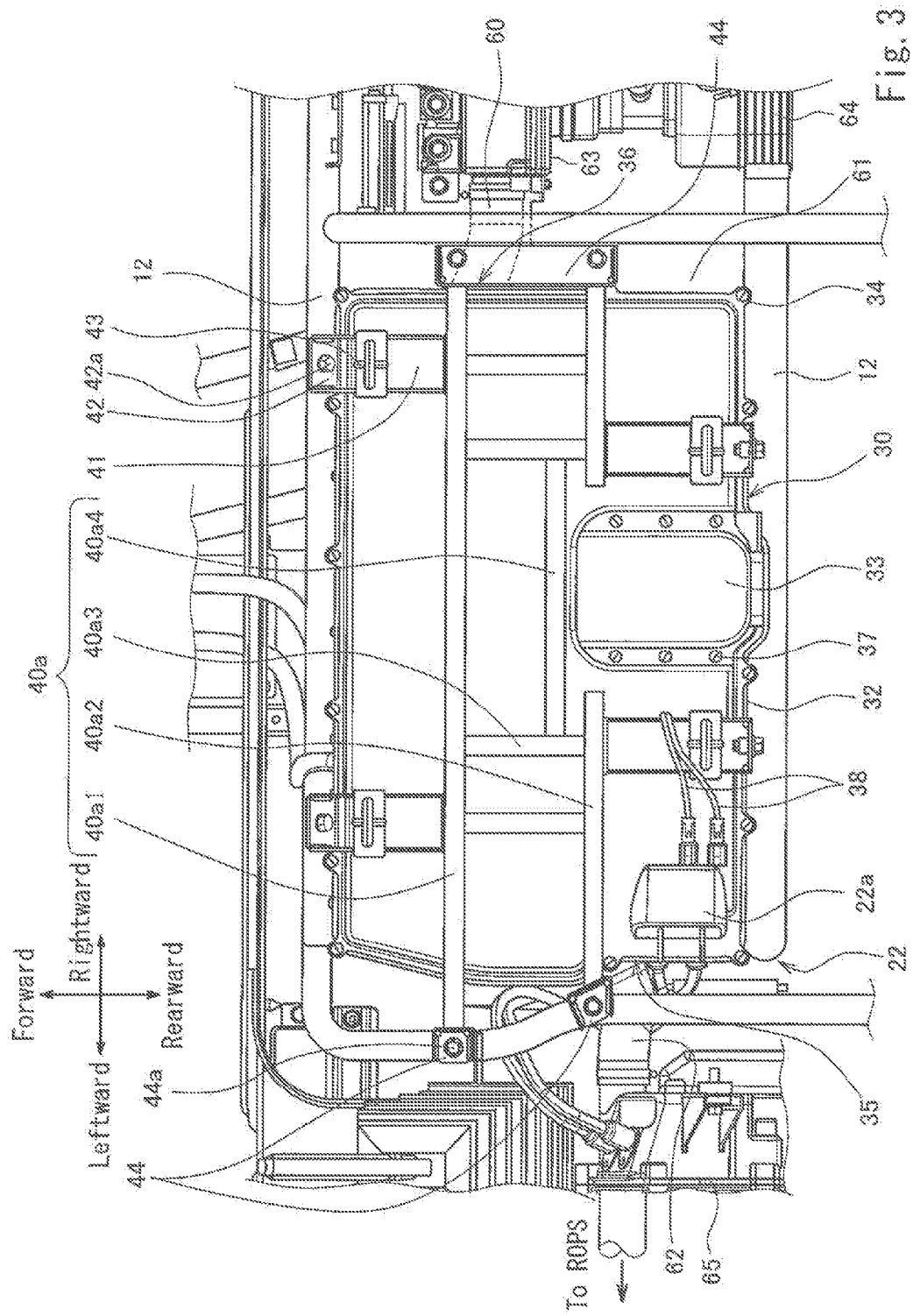
FIG. 3 is a plan view showing an exemplary state in which a battery pack is mounted to the electric utility vehicle of FIG. 1.
Figure 4:
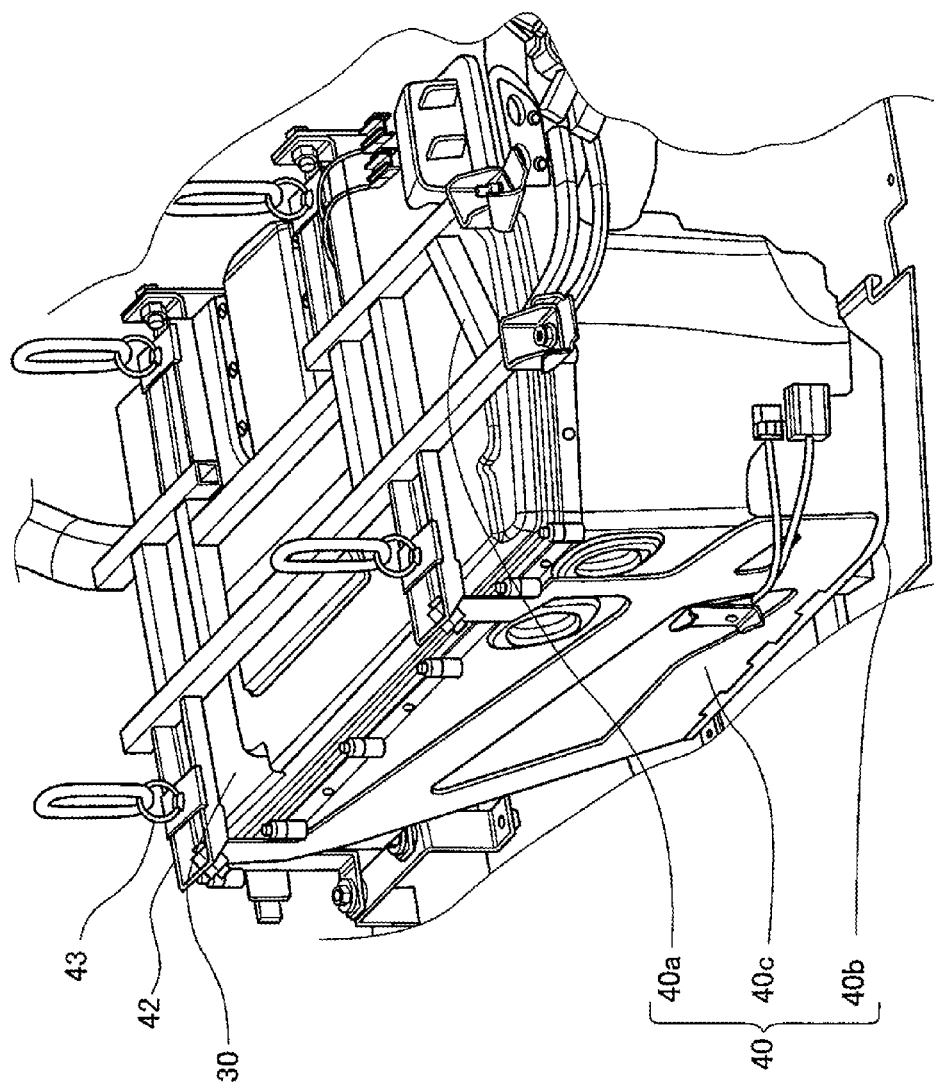
FIG. 4 is a perspective view showing an exemplary state in which the battery pack is mounted to the electric utility vehicle of FIG. 1.
Figure 5:
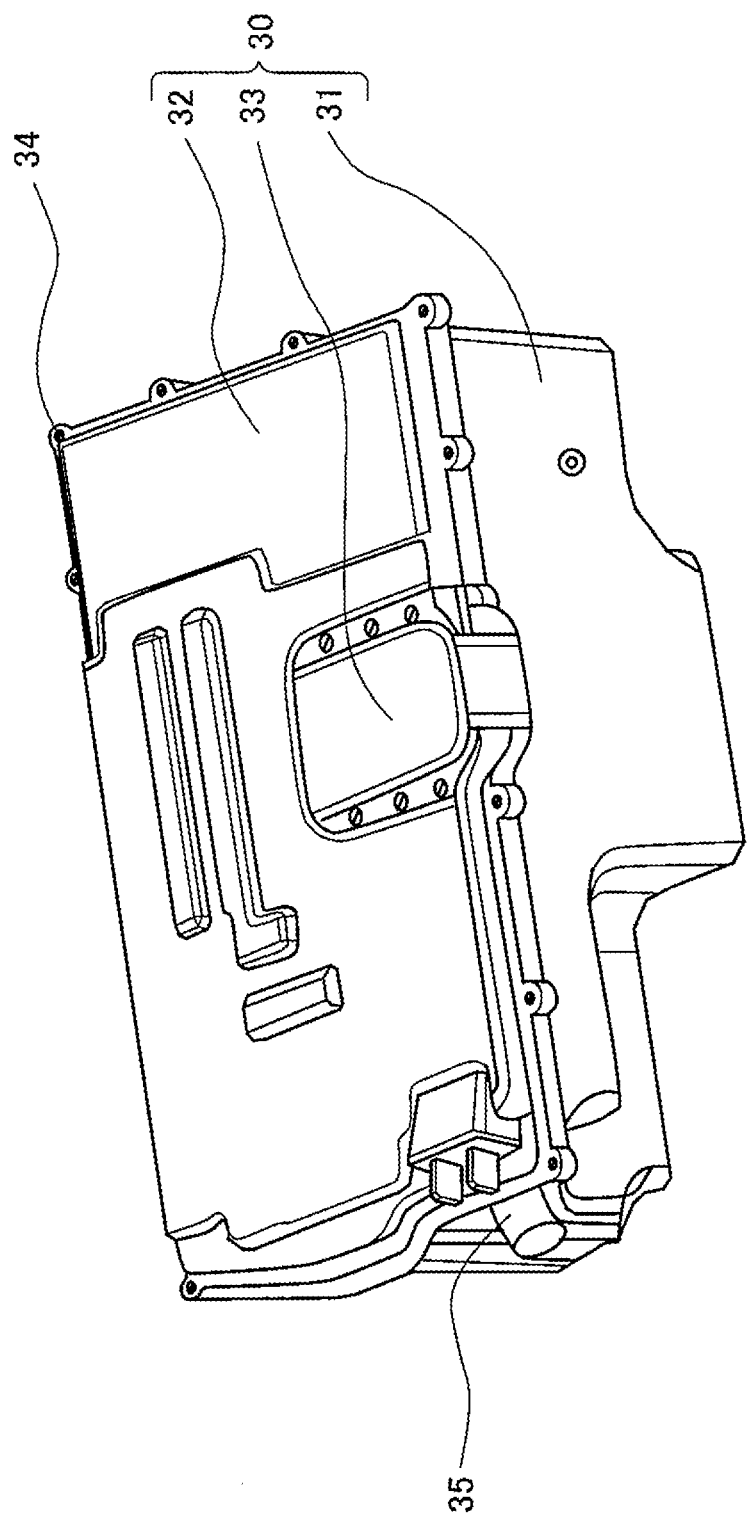
FIG. 5 is a perspective view showing the outer shape of a battery case in a state in which an external frame unit is detached from the battery pack of FIGS. 3 and 4.

The configuration of the battery pack 22 of the present embodiment will be described with reference to FIGS. 3 to 5. FIG. 3 is a plan view showing an exemplary state in which the battery pack 22 is mounted to the electric utility vehicle 1 of FIG. 1. FIG. 4 is a perspective view showing an exemplary state in which the battery pack 22 is mounted to the electric utility vehicle 1 of FIG. 1. FIG. 5 is a perspective view showing the outer shape of the battery case 30 in a state in which an external frame unit 40 is detached from the battery pack 22 of FIGS. 3 and 4.

As described above, the battery pack 22 is placed in the space surrounded by the seat frames 12 below the seat 6 (see FIG. 1). The battery pack 22 is placed such that the lengthwise direction of the battery pack 22 is parallel to the vehicle width direction of the vehicle body 2 of the electric utility vehicle 1. As shown in FIGS. 3 and 4, the battery pack 22 includes the battery case 30 for accommodating a plurality of batteries 49 (see FIG. 8) in a collective manner, and the external frame unit 40 which is placed on the outer surface of the battery case 30 and supports the battery case 30 from below when the battery case 30 is suspended.

(Battery Case)

As shown in FIG. 5, the battery case 30 includes a case body section 31 formed of insulating synthetic resin, and a case lid section 32. The case body section 31 is opened upward, and has an accommodating space of the batteries 49 inside thereof. The opening of the case body section 31 is closable by the case lid section 32. The edge portion of the case lid section 32 overlaps with the edge portion of the opening of the case body section 31. As shown in FIG. 3, the overlap edge portions of the outer peripheral portions of the case lid section 32 and of the case body section 31 are fastened to each other by a plurality of fastening members 34 (e.g., screws or bolts). This allows the case the lid section 32 to be sealably fastened to the case body section 31 (with fluid-tightness).

As should be understood from the above, the battery case 30 is vertically dividable into upper and and lower parts which are the case lid section 32 provided over the case body section 31, and the case body section 31, respectively. Specifically, the lower edge portion of the case lid section 32 is located outward relative to the opening of the case body section 31. This structure makes it possible to prevent rain water flowing from above the battery case 30 toward a region which is below the battery case 30 from entering the battery case 30. Since the battery case 30 is vertically dividable into upper and lower parts, it becomes possible to reduce a possibility that the boundary portion (joint portion) of the case lid section 32 and of the case body section 31 from getting wet with the water, as compared to a case where the battery case 30 is horizontally dividable into right and left parts.

As shown in FIG. 5, the case body section 31 is a container which, as a whole, has a substantially rectangular parallelepiped shape and is opened upward, although the case body section 31 is partially formed with concave-convex portions to prevent interference between the battery case 30 and other devices located in the vicinity of the battery case 30. An air suction section (see FIG. 3 and FIG. 9, which will be described later) 36, through which the air for cooling the interior of the battery case 30 is introduced into the battery case 30, is provided on the right side portion of the case body section 31, in a state in which the battery case 30 is mounted to the electric utility vehicle 1. In contrast, an air discharge section 35 (see FIG. 5) through which the air which has flowed through the interior of the battery case 30 is discharged outside of the battery case 30 is provided on the left side portion of the case body section 31. In brief, the air suction section 36 and the air discharge section 35 are placed at the right and left sides of the battery case 30 in the lengthwise direction. The flow of the air supplied as a cooling medium to the interior of the battery case 30 will be described later.

The bottom surface of the case body section 31 has a groove section which is recessed downward so as to surround the outer periphery of the bottom surface of the case body section 31. The groove section is provided with a drain port through which the water accumulated in the interior of the battery case 30 is discharged outside.

In this structure, for example, even when water droplets are generated in the interior of the battery case 30 due to condensation or the like, the water droplets are reserved in the groove section of the bottom surface of the case body section 31, and discharged outside through the drain port provided in the groove section of the case body section 31.

As shown in FIG. 3, the case lid section 32 has a substantially rectangular shape when viewed from above, and is longer in a rightward and leftward direction than in the forward and rearward direction, in the state in which the battery case 30 is mounted to the electric utility vehicle 1.

The case lid section 32 has a region in which the external frame unit 40 is not placed, at a rear side of a substantially center portion in the rightward and leftward direction. A plug lid section 33 is placed in this region. Specifically, the case lid section 32 has an opening of a substantially square shape in a location corresponding to a service plug (see FIG. 8) 56, which will be described later, which is placed inside the case body section 31, and the plug lid section 33 of a substantially square shape, which is larger in dimension than this opening, is attached to close the opening. The outer peripheral portion of the plug lid section 33 overlaps with the case lid section 32. The plug lid section 33 is attached to the case lid section 32 by threadingly engaging the overlap outer peripheral portions with a plurality of fastening members 37. Since the plug lid section 33 is provided in this way, an operator can access only the service plug 56 without opening the case lid section 32.

As shown in FIG. 3, the charging port 22a is provided in the vicinity of a left corner at the rear side of the case lid section 32, in the state in which the battery case 30 is mounted to the electric utility vehicle 1. The charging port 22a is a receiver port for receiving the electric power supplied from outside. The charging port 22a is connected to the plurality of batteries 49 accommodated into the battery case 30 via two connection cords 38. Since the charging port 22a is placed on the upper surface of the case lid section 32 as described above, it is not necessary to detach the case lid section 32 when charging of the batteries 49 of the battery pack 22 is performed.

(External Frame Unit)

The battery assembly 48, which will be described later, is accommodated into the battery case 30 has a weight of about 60 Kg. For this reason, the battery case 30 is protected by the external frame unit 40, to prevent damages to the battery case 30 due to the weight of the battery assembly 48 when the battery case 30 is suspended and lifted up.

Now, the external frame unit 40 will be described in detail. As shown in FIGS. 3 and 4, the external frame unit 40 includes an upper support section 40a placed on the upper surface of the battery case 30 (upper surface of the case lid section 32), a lower support section 40b placed on the lower surface of the battery case 30 (lower surface of the case body section 31), and a coupling section 40c coupling the upper support section 40a to the lower support section 40b. The external frame unit 40 is formed of metal such as iron, stainless, or aluminum. The external frame unit 40 is able to retain the battery case 30 in a space surrounded by the external frame unit 40 in such a manner that the battery case 30 is vertically retained between the upper support section 40a and the lower support section 40b via the coupling section 40c. Since the upper support section 40a, the lower support section 40b, and the coupling section 40c surround the battery case 30, the battery case 30 is protected from forces applied externally.

As shown in FIG. 3, the upper support section 40a has a shape like a ladder, including two elongated rod members 40a1, 40a2 extending in parallel with the lengthwise direction of the battery case 30 (rightward and leftward direction of the electric utility vehicle 1), and a plurality of reinforcement members 40a3 placed between the elongated rod members 40a1, 40a2 to couple the elongated rod members 40a1, 40a2 to each other such that the reinforcement members 40a3 are spaced a specified distance apart from each other. In the upper support section 40a, of the two elongated rod members 40a1, 40a2, the elongated rod member 40a2 placed at the rear side of the electric utility vehicle 1 is divided in, to be precise, a center portion in the lengthwise direction. In this region, an auxiliary rod member 40a4 is placed substantially parallel with the elongated rod member 40a2 and between the reinforcement members 40a3 to couple the reinforcement members 40a3 to each other. The elongated rod members 40a1, 40a2, and the reinforcement members 40a3 described above are constituted by hollow square members, and are welded to each other to form the upper support section 40a.

If the elongated rod member 40a2 placed at the rear side of the electric utility vehicle 1, of the two elongated rod members 40a1, 40a2 extends in the rightward and leftward direction, without cutting the elongated rod member 40a2, then the elongated rod member 40a2 will be placed above the plug lid section 33 and become an obstacle to the opening and closing of the plug lid section 33. In the present embodiment, to prevent the upper support section 40a from impeding the opening and closing of the plug lid section 33 while ensuring its stiffness, a portion of the elongated rod member 40a2 placed at the rear side of the electric utility vehicle 1 is cut, and the auxiliary rod member 40a4 is provided in this region.

Furthermore, the upper support section 40a includes metal-made protruding members 41 protruding outward in the forward and rearward direction of the electric utility vehicle 1, from the elongated rod members 40a1, 40a2. In the present embodiment, each of the elongated rod members 40a1, 40a2 of the upper support section 40a is provided with two protruding members 41. The protruding members 41 extend along the upper surface of the battery case 30, in a direction that is substantially perpendicular to the elongated rod members 40a1, 40a2.

Each of the protruding members 41 includes a mounting section 43 as will be described later, and a first fastening section 42 provided at the tip end portion thereof. The upper support section 40a and the coupling section 40c are coupled to each other by the first fastening sections 42. As shown in FIGS. 3 and 4, the protruding member 41 has a shape in which its outer edge extends upward, and its cross-section has a substantially-U shape. The tip end portion of the protruding member 41 has a surface (first fastening section 42) extending upward. The first fastening section 42 and a fastening section (not shown) of the coupling section 40c are removably fastened to each other by a fastening member 42a. Alternatively, the first fastening section 42 and the coupling section 40c may be fastened to each other via a rubber damper (not shown).

As should be understood from the above, the first fastening section 42 is located at a distance from a location where the seat frame 12 and the battery case 30 are adjacent to each other. This allows the operator to access the first fastening section 42 without interference with the seat frame 12 in a state in which the battery pack 30 is placed in the vehicle body 2. Since the operator can easily access the first fastening section 42, the operator can efficiently perform the operation for mounting the upper support section 40a and the coupling section 40c to each other and removing the upper support section 40a and the coupling section 40c from each other.

In the upper support section 40a, the protruding members 41 are provided in four locations such that the protruding members 41 protrude in the forward and rearward direction from the elongated rod members 40a1, 40a2, and the protruding members 41 of each of the elongated rod members 40a1, 40a2 are spaced at a predetermined distance from each other in the rightward and leftward direction. This makes it possible to stably suspend and lift up the battery pack and couple the upper support section 40a and the coupling section 40c to each other.

Furthermore, each of the protruding members 41 is provided with the mounting section 43 to be engaged with a hook 70b, which will be described later, on a metal plate placed to extend between lateral ends inside the protruding member 41. The hook 70b of a suspending device such as a crane is engaged with the mounting section 43. In the protruding member 41, the mounting section 43 and the first fastening section 42 may be separate members or a common member. In a case where the mounting section 43 and the first fastening section 42 are the common member, the number of components can be reduced, which is an advantage.

As shown in FIG. 3, the upper support section 40a is provided with a plurality of second fastening sections 44 at the both end portions of the elongated rod members 40a1, 40a2, which are used to fasten the elongated rod members 40a1, 40a2 to the vehicle body frame 20 surrounding the battery pack 22 or an external member such as a bracket fastened to the vehicle body frame 20. Specifically, the second fastening sections 44 protrude in a direction (toward the external member fastened to the vehicle body frame 20 surrounding the battery pack 22) that is perpendicular to the side surface of the battery pack 22. As shown in FIG. 3, the upper support section 40a is fastened to the two seat frames 12 placed to sandwich the upper support section 40a in the rightward and leftward direction, by using the second fastening sections 44. The second fastening sections 44 can be removably fastened to the vehicle body frame 20 or the external member by the fastening members 44a.

By using the second fastening sections 44, the battery pack 22 can be more firmly fastened to the electric utility vehicle 1. Alternatively, in order to prevent a situation in which the battery pack 22 is unsteadily fastened to the electric utility vehicle 1 during driving of the electric utility vehicle 1, due to a gap formed between the second fastening section 44 and the seat frame 12 or the external member, a rubber damper (not shown) may be placed between the second fastening section 44 and the seat frame 12 or the external member.

For example, the second fastening sections 44 are placed on the upper surface of the external member in an overlap manner, and fastened thereto by using the fastening members 44a. This allows the lower portion of the battery case 30 to be located below a portion of the vehicle body frame 20 to which portion the upper support section 40a is mounted. Because of this, the stiffness of a portion of the vehicle body frame 20 which supports the lower support section 40b can be reduced, although it is necessary to increase the stiffness of a portion of the vehicle body frame 20 which is fastened to the upper support section 40a via the fastening members 44a.

The upper support section 40a is placed above the battery case 30, and each of the elongated rod members 40a1, 40a2 of the upper support section 40a extends between the two fastening sections 44. Because of this, even when another component such as the seat 6 is placed above the battery pack 22, this component can be supported by the elongated rod members 40a1, 40a2. As a result, it becomes possible to prevent the load of this component from being directly applied to the battery case 30.

The lower support section 40b is in surface contact with the bottom surface of the battery case 30 to support the battery case 30 from below. The lower support section 40b is formed of a flat plate conforming in shape to the bottom surface of the battery case 30. As shown in FIG. 4, the end portions of the lower support section 40b, which are in contact with the side surfaces of the battery case 30, corresponding to the short sides of the battery case 30 when viewed from above, are bent to be in surface contact with the portions of these side surfaces of the battery case 30. Also, the portions of the lower support section 40b are bent to be in surface contact with the side surfaces of the battery case 30, corresponding to the long sides of the battery case 30 when viewed from above such that the bent portions partially cover these side surfaces and are coupled to the upper support section 40a. In the present embodiment, the portions which are partially in surface contact with the side surfaces of the battery case 30 corresponding to the short sides, and the side surfaces of the battery case 30 corresponding to the long sides, will be referred to as the coupling section 40c.

As shown in FIG. 4, the coupling section 40c is a plate member of a frame shape which is placed to conform in shape to the four side surfaces of the battery case 30. The upper portion of the coupling section 40c is removably joined to the first fastening sections 42 of the upper support section 40a, while the lower portion of the coupling section 40c is integrated with the lower support section 40b. The coupling section 40c couples the upper support section 40a and the lower support section 40b to each other such that they are not disengaged. Therefore, when the battery pack 22 is suspended and lifted up, the lower support section 40b receiving the weight of the battery case 30 can be lifted-up with an upward force applied to the upper support section 40a and to the lower support section 40b via the coupling section 40c.

The coupling section 40c covers at least the lower portions of the four side surfaces of the battery case 30, and makes it possible to prevent the battery case 30 from being displaced in the forward and rearward direction or in the rightward and leftward direction, with respect to the external frame unit 40. The coupling section 40c also makes it possible to prevent the battery case 30 from being vertically displaced with respect to the external frame unit 40, even when a vertical impact is generated in the vehicle body 2 due to acceleration, deceleration or collision of the electric utility vehicle 1.

As shown in FIG. 4, the ratio of the portions of the side surfaces of the long sides of the battery case 30 which are covered by the coupling section 40 is higher than the ratio of the portions of the side surfaces of the short sides of the battery case 30 which are covered by the coupling section 40. With this structure, it becomes possible to support the battery case 30 even when the long sides of the battery case 30 are affected due to acceleration or deceleration of the electric utility vehicle 1.

As described above, the upper support section 40a of the external frame unit 40 is provided with the first fastening sections 42 and the second fastening sections 44. Since the upper support section 40a, which is easily accessed by the operator, is provided with the first fastening sections 42 and the second fastening sections 44, the operator can easily perform the operation for mounting and removing the upper support section 40a, and perform maintenance for electric components, which will be described later, accommodated into the battery case 30.

(Mounting Structure of Battery Pack)

Figure 6:
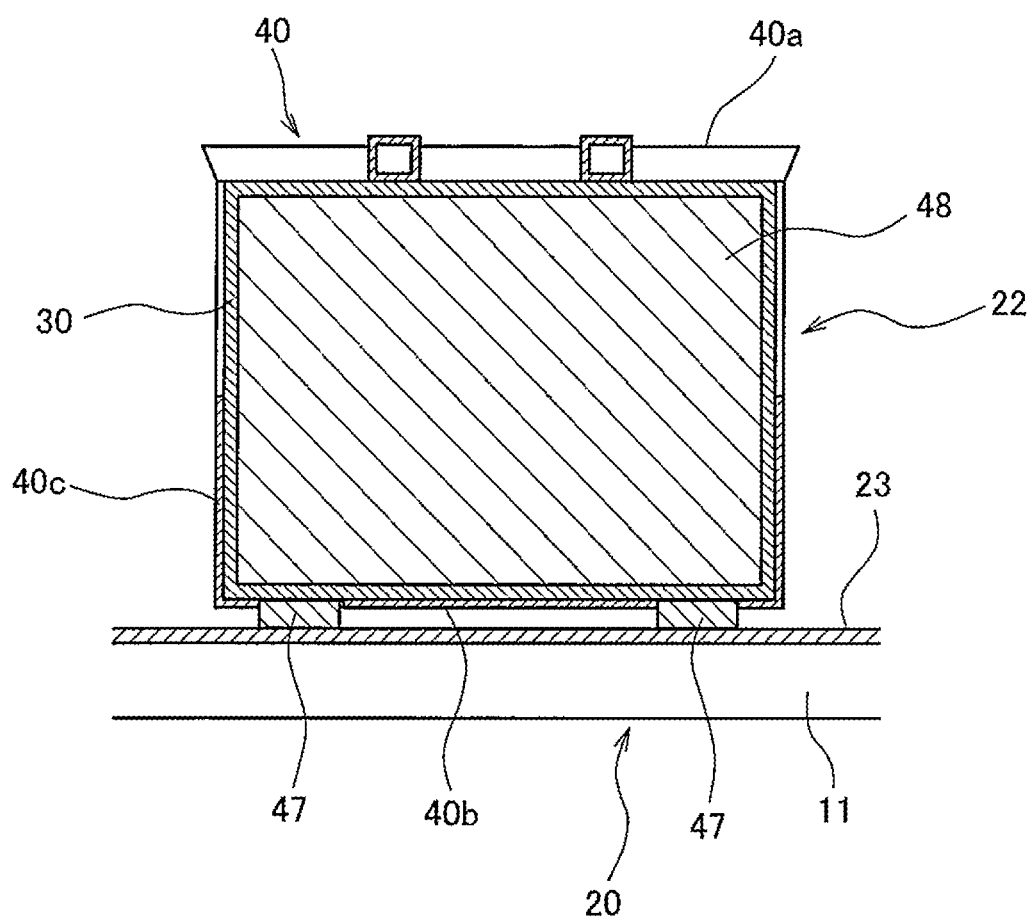
FIG. 6 is a cross-sectional view showing the mounting structure of the battery pack of FIGS. 3 and 4.

Next, the mounting structure by which the battery pack 22 is mounted to the vehicle body 2 will be described with reference to FIG. 6. FIG. 6 is a cross-sectional view showing the mounting structure of the battery pack 22 of FIGS. 3 and 4. As shown in FIG. 6, the lower surface of the battery case 30 (or lower surface of the lower support section 40b) is provided with buffer members 47 comprised of an elastic material such as rubber. As shown in FIG. 3, when the second fastening sections 44 are fastened to the external member such as the bracket by using the fastening members 44a, the buffer members 47 are compressed between the lower surface of the battery case (or lower surface of the lower support section 40b) and the upper surface of the floor panel 23, as shown in FIG. 6.

In the above-described manner, the battery pack 22 is mounted onto the floor panel 23 via the buffer members 47. The battery pack 22 mounted onto the floor panel 23 in this way is carried out of the vehicle body 2 by the operator in the following manner.

(Method of Carrying Battery Pack Out of Vehicle Body)

Figure 7:
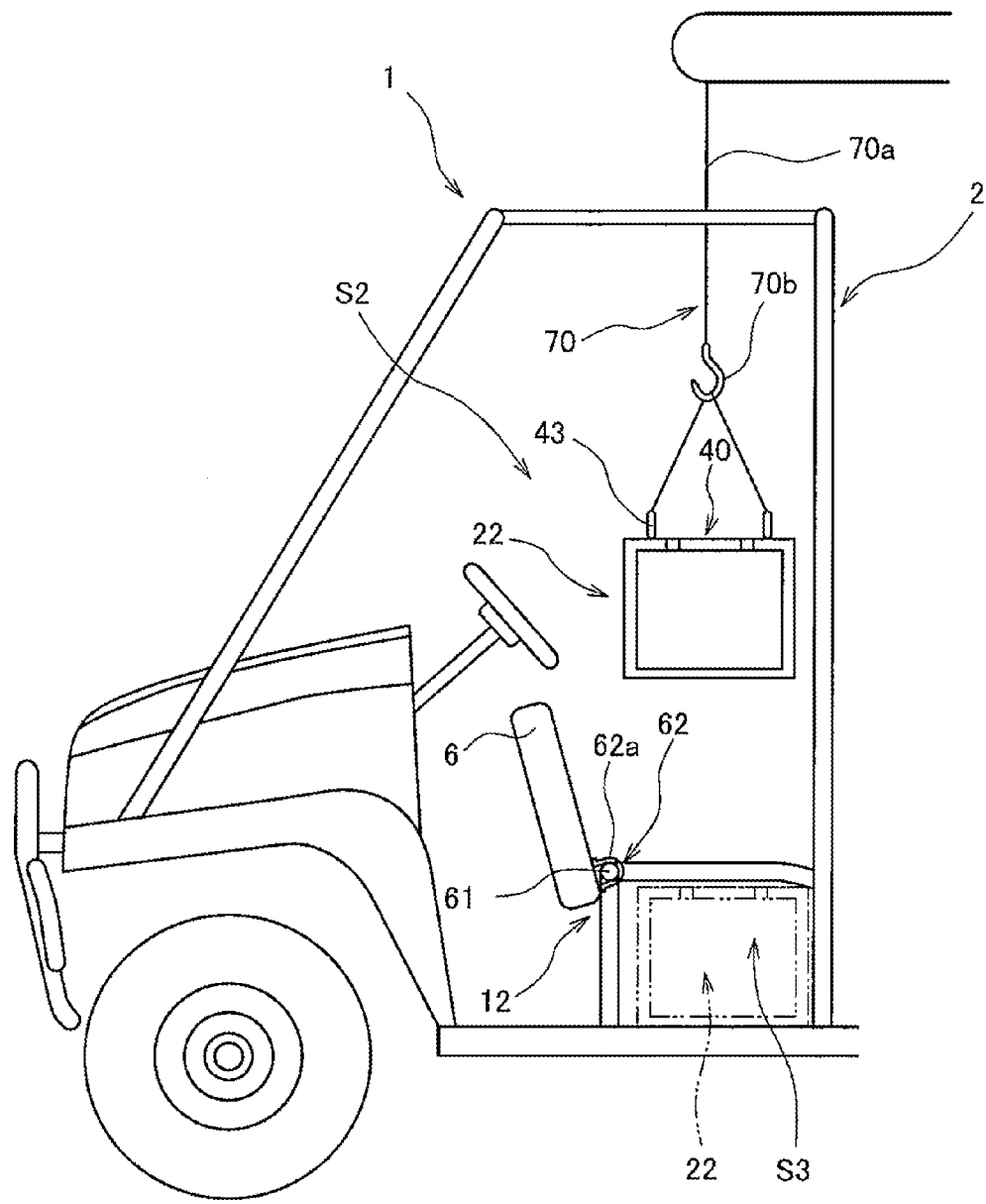
FIG. 7 is a left side view showing a method of carrying the battery pack of FIGS. 3 and 4 out of a vehicle body.

Now, a method of carrying the battery pack 22 out of the vehicle body 2 will be described with reference to FIG. 7. FIG. 7 is a left side view showing the method of carrying the battery pack 22 of FIGS. 3 and 4 out of the vehicle body 2. Initially, locking and unlocking of a lock mechanism with respect to the seat 6 will be described.

As shown in FIG. 7, the seat 6 is provided with a plurality of U-shaped engagement members 62 placed at specified intervals in the rightward and leftward direction of the electric utility vehicle 1. A substantially-semi-cylindrical portion 62a of each of the engagement members 62 is rotatably engaged with the outer peripheral surface of a cross pipe member 61. In a state in which the seat 6 is placed over the seat frames 12 in this configuration, the seat 6 is fixed by the lock mechanism (not shown). As shown in FIG. 7, when this lock mechanism is unlocked, the seat 6 is rotated upward around the engagement members 62. Since the seat 6 is moved in this way, a battery accommodating space S3 is exposed when viewed from above, and the battery pack 22 is moved in an upward direction and taken out of the battery accommodating space S3.

When the battery pack 22 is carried out of the vehicle body in the electric utility vehicle 1, as shown in FIG. 7, the seat 6 is rotated upward around the engagement members 62, and thus the battery pack 22 in the battery accommodating space S3 is exposed when viewed from above. Then, the fastening members 44a fastening the second fastening sections 44 to the vehicle body frame 20 are removed. Then, a suspending unit 70 is moved down toward the battery pack 22 from above the vehicle body 2 toward the battery pack 22 and connected to the battery pack 22. More specifically, the hook 70 of the suspending unit 70 is engaged with the mounting sections 43 of the external frame unit 40 provided on the battery pack 22.

Then, the battery pack 22 is suspended and lifted up by using the suspending unit 70, and lifted up from the battery accommodating space S3. In this way, the operator can lift up the battery pack 22 and carry out the battery pack out of the vehicle body 2.

Conversely, when the battery pack 30 carried out of the vehicle body 2 is mounted to the vehicle body 2, the battery pack 22 which is suspended and lifted up by the suspending unit 70 is moved down, and the external frame unit 40 of the battery pack 22 is supported by the constituent member of the vehicle body frame 20 which is adjacent to the battery pack 22 via the second fastening sections 44. At this time, the second fastening sections 44 of the external frame unit 40 fastening the vehicle body frame 20 to the battery pack 22 protrude farther than the battery case 30 in the rightward and leftward direction of the electric utility vehicle 1. This allows the external frame unit 40 to be easily supported by the vehicle body frame 20 via the second fastening sections 44. Thus, in the state in which the external frame unit 40 is supported by the vehicle body frame 20, the suspending unit 70 is disconnected from the mounting sections 43, and the operation for fastening the second fastening sections 44 of the external frame unit 40 to the vehicle body frame 20 can proceed. By using the second fastening sections 44 placed at the right and left end portions of the upper support section 40a of the external frame unit 40, the battery pack 22 can be supported by the vehicle body frame 20 more stably.

(Structure of Battery Assembly)

Figure 8:
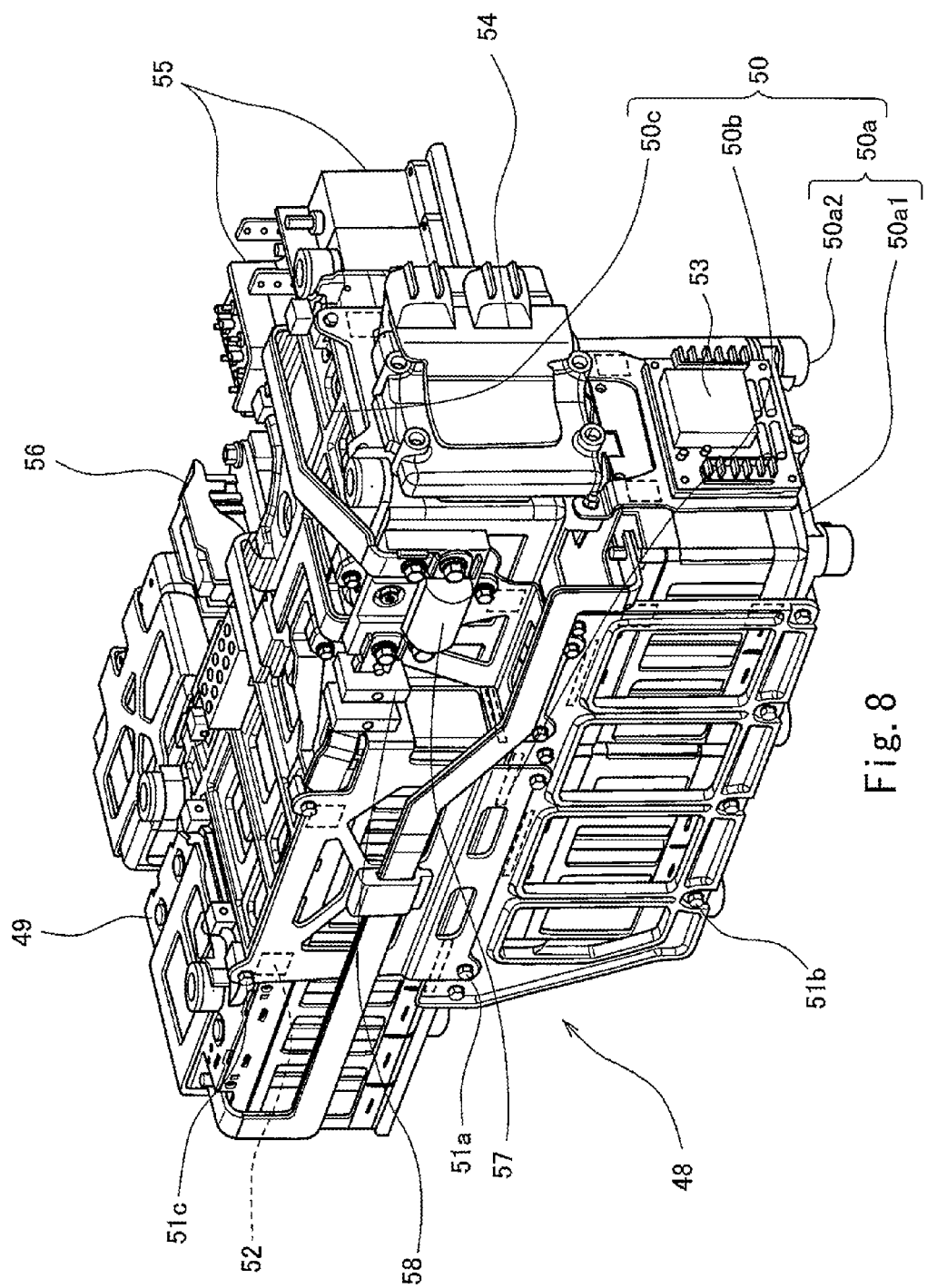
FIG. 8 is a perspective view showing an exemplary battery assembly according to the present embodiment.

Next, a battery assembly 48 including the plurality of batteries 49 accommodated into the above battery case 30 will be described with reference to FIG. 8. The batteries 49 are configured to store the electric power for activating the electric utility vehicle 1, and may be, for example, a secondary battery such as a lithium ion battery. FIG. 8 is a perspective view showing the exemplary battery assembly 48 according to the embodiment.

As shown in FIG. 8, the plurality of batteries 49 are accommodated into the battery case 30 as an assembly (battery assembly 48) fastened by an internal frame unit 50, rather than a single component.

As shown in FIG. 8, the batteries 49 are accommodated into a casing of a substantially rectangular parallelepiped shape. The batteries 49 are electrically connected in series. The batteries 49 are assembled to have a desired shape by the internal frame unit 50. In the present embodiment, as shown in FIG. 8, the plurality of batteries 49 which are coupled to each other are composed of the batteries at an upper side and the batteries at a lower side.

The internal frame unit 50 serves to couple the plurality of batteries 49 to each other. As shown in FIG. 8, the internal frame unit 50 includes a lower battery support section (battery support section) 50a, a coupling/retaining section (retaining section) 50b, and an upper battery support section (retaining section 50c).

The lower battery support section 50a is placed on the bottom surfaces of the plurality of batteries 49 coupled to each other at the lower side and supports the batteries 49 from below. As shown in FIG. 8, the lower battery support section 50a includes a frame member 50a1 placed to conform in shape to the edge portions of the bottom surfaces of the plurality of batteries 49 coupled to each other, and a plurality of leg members 50a2 protruding downward from the frame member 50a1. Therefore, the lower battery support section 50a is able to support the plurality of batteries 49 in a collective manner from below by the frame member 50a1 placed to conform in shape to the edge portions. In a state in which the battery assembly 48 is accommodated into the battery case 30, the battery assembly 48 is in surface contact with the bottom surface of the interior of the battery case 30 in a plurality of locations which are the plurality of leg members 50a2. In this configuration, the weight of the plurality of batteries 48 supported by the lower battery support section 50a is applied in a dispersed manner to the bottom surface of the interior of the battery case 30.

As shown in FIG. 8, the coupling/retaining section 50b is a metal-made frame member placed on the side surfaces of the plurality of batteries 49 which are exposed to the outside. The coupling/retaining section 50b covers the plurality of batteries 49 in a collective manner to couple the plurality of batteries 49 arranged horizontally to each other. In addition, the coupling/retaining section 50b is placed between the lower battery support section 50a and the upper battery support section 50c and fastens the batteries 49 arranged at the upper side and the lower side by retaining them between the lower battery support section 50a and the upper battery support section 50c.

The coupling/retaining section 50b is roughly separated into a frame member covering the batteries 49 placed at the upper side and a frame member covering the batteries 49 placed at the lower side. These frame members are fastened to each other by fastening members 51a in a plurality of locations. The coupling/retaining section 50b is fastened to the lower battery support section 50a by fastening members 51b, at the lower end portion of the lower frame member. The coupling/retaining section 50b is fastened to the upper battery support section 50c by fastening members 51c, at the upper end portion of the upper frame member.

The upper battery support section 50c is placed on the upper surfaces of the plurality of batteries 49 coupled to each other at the upper side, to couple the batteries 49 to each other at the upper side. As shown in FIG. 8, the upper battery support section 50*c* is a metal-made frame member having a plurality of apertures, which is placed on the upper surfaces of the plurality of batteries 49 which are to be coupled to each other at the upper side. The upper battery support section 50*c* includes a combination of a plurality of frame members which are different in dimension, to lay out the electric components and the like, which will be described later.

In the present embodiment, the lower battery support section 50*a* supporting the plurality of batteries 49 coupled to each other from below, and the frame member of the coupling/retaining section 50*b*, which is placed on the side surfaces of the batteries 49 placed at the lower side, are manufactured by machining aluminum in order to increase strength, because the weight of the batteries 49 is applied to the lower battery support section 50*a* and this frame member. In contrast, the upper battery support section 50*c* and the frame member of the coupling/retaining section 50*b*, which is placed on the side surfaces of the batteries 49 placed at the upper side, are not required to have high strength, because the upper battery support section 50*c* and this frame member are not affected so much by the weight of the batteries 49. Therefore, they are formed of an aluminum plate.

As shown in FIG. 8, a plurality of rubber dampers 52 filled into a gap (dimension misalignment) formed between the internal frame unit 50 and the batteries 49 are attached to the surface of the internal frame unit 50 (especially, coupling/retaining section 50*b*) which is closer to the batteries 49. This makes it possible to prevent a situation in which the batteries 49 are displaced and unsteadily fastened, within the internal frame unit 50.

As shown in FIG. 8, the battery assembly 48 is placed so that various electric components other than the above batteries 49 are combined with the batteries 49 to be handled in a collective manner.

Specifically, as shown in FIG. 8, a ground leakage sensor 53 is attached on the side surface of the plurality of batteries 49 coupled to each other at the lower side, corresponding to the short side. A battery management unit (BMU) 54 is disposed above the ground leakage sensor 53 and attached on the side surface of the plurality of batteries 49 coupled to each other at the upper side, which corresponds to the short side.

The ground leakage sensor 53 detects whether or not a ground leakage has occurred in the battery assembly 48, and outputs a detection signal to the BMU 54.

The BMU 54 is a control circuit which is connected to the batteries 49 to monitor the state of each of the batteries 49, perform voltage control, manage a state of charge (SOC), etc. The BMU 54 monitors the state of each of the the batteries 49, and sends information regarding the state of each of the the batteries 49 to a main control unit (not shown) which controls the monitor unit 19, etc.

A contactor 55 is attached to the right side surface of the battery 49 attached with the BMU 54. As shown in FIG. 8, the service plug 56 is provided adjacently to the side surface of the contactor 55 which is on an opposite side of the BMU 54.

The contactor 55 is placed on a power supply path between the batteries 49 and the inverter 21 and performs switching between battery power supply and battery power cut-off with respect to the inverter 21, to control the opening/closing of a motor load. A connection terminal to which the above connection cords 38 are connected is placed above the contactor 55.

The service plug 56 is detached during inspection or maintenance so that a high voltage in the battery assembly 48 is cut off. In this way, safety of the inspection or maintenance can be secured.

A main fuse 57 and a current sensor 58 for measuring the value of a current flowing through the interior of the battery assembly 48 are attached on the left side surface of the battery 49 to which the BMU 54 is attached.

As described above, the plurality of batteries 49, and the electric components such as the ground leakage sensor 53, the BMU 54, the contactor 55, the service plug 56, the main fuse 57, and the current sensor 58, are integrated and assembled into the battery assembly 48. Thus, in accordance with the battery pack 22 of the present embodiment, the batteries 49 and the electric components can be accommodated into the battery case 30. Note that the electric components integrated into the battery assembly 48 are not limited to those described above.

(Cooling Mechanism in the Interior of the Battery Case)

Next, a cooling mechanism in the interior of the battery case 30 will be described with reference to FIG. 9, in addition to FIG. 3. FIG. 9 is a view showing a region which is in the vicinity of the air suction section 36 included in the battery case 30, of the battery pack 22 of FIGS. 3 and 4. As shown in FIG. 9, in the above-described battery pack 22 of FIGS. 3 and 4, an air diffusing section 59 is accommodated into the battery case 30. Briefly, FIG. 9 shows a state in which a first pipe 60 extending from a sirocco fan 63, which will be described later, is detached from the battery case 30.

In the electric utility vehicle 1 of the present embodiment, the vehicle body frame 20 has a hollow tubular shape, and is provided with an air inlet (not shown). During driving of the electric utility vehicle 1, the air is introduced from outside into the vehicle body frame 20 through the air inlet, and flows into the battery case 30. Thus, the air flowing through the interior of the vehicle body frame 20 is guided to an air cleaner 64. As shown in FIG. 3, the air cleaner 64 is connected to the sirocco fan 63, and the air which has flowed through the air cleaner 64 is discharged and guided to the battery pack 22 through the first pipe 60, by the action of the sirocco fan 63.

As shown in FIG. 9, a recess is provided at the lower side of the right side portion of the battery case 30, and the air suction section 36 is provided in this recess. An air inlet 66 of an air diffusing section 59 accommodated into the battery case 30 protrudes from the air suction section 36. The air inlet 66 is coupled to the first pipe 60.

The air diffusing section 59 serves to diffuse in the interior of the battery case 30, the air guided to the interior of the battery case 30. The air diffusing section 59 is a hollow member including one air inlet 66 and a plurality of air outlets 68 provided in a plurality of surfaces facing in different directions. As shown in FIG. 9, for example, the air diffusing section 59 is a hollow member of a substantially triangular prism shape. When the surface provided with the cylindrical air inlet 66 is a first side surface 67*a*, the side surface located on the right side of the first side surface 67*a* is a second side surface 67*b*, and the side surface located on the left side of the first side surface 67*a* is a third side surface 67*c*. The air diffusing section 59 is covered with five surfaces which are a diffusing upper surface 67*d*, a diffusing bottom surface 67*e*, the first side surface 67*a*, the second side surface 67*b*, and the third side surface 67*c*. Among these surfaces, the surfaces other than the first side surface 67*a* are provided with a plurality of air outlets 68 which are hole shaped. The air flowing into the battery case 30 through the air inlet 66 is discharged through the air outlets 68 provided in the four surfaces, which allows the air to flow in four directions. In this structure, the air can be delivered uniformly to the battery assembly 48 formed by coupling the plurality of batteries 49 at the upper side and the lower side as shown in FIG. 8. Since the air can be delivered to the interior of the battery case 30 in a diffusing manner in this way, the battery assembly 48 can be cooled efficiently with the air.

The air guided to the interior of the battery case 30 is discharged outside of the battery case 30 through the air discharge section 35 provided in the side surface which is on an opposite side of the surface in which the air suction section 36 is provided.

The air which has taken the heat from the interior of the battery pack 22 and the interior of the controller case 65, is guided to the vehicle body frame, flows through the interior of the vehicle body frame, and is discharged outside through a discharge outlet (not shown).

In the above-described manner, the battery pack 22 and the controller case 65 of the present embodiment are cooled.

As described above, the external frame unit 40 of the present embodiment has a structure in which the upper support section 40a and the lower support section 40b are coupled to each other by the coupling section 40c. The upper support section 40a and the coupling section 40c are removably joined to each other by threading engagement. In this case, the case lid section 32 can be detached without a need to remove the whole external frame unit 40 from the battery case 30. Then, the battery assembly 48 can be taken out of the battery case 30. In brief, the battery assembly 48 is easily removably mounted to the vehicle body of the electric utility vehicle 1.

The present invention is not limited to the above-described configuration in which the upper support section 40a and the coupling section 40c are removably joined to each other in the above-described manner. For example, the coupling section 40c may be composed of two members which are vertically separable, and the two members may be removably joined to each other.

Although the electric utility vehicle 1 of the present embodiment is configured such that the battery pack 22 is placed below the seat 6, the present invention is not limited to this. For example, the battery pack 22 may be placed in a space formed below the cargo bed. More specifically, the battery pack 22 may be placed in the front portion of a space formed between the right and left rear frames 13 of the vehicle body 2, or below both of the seat and the cargo bed.

The configuration of the battery pack 22 of the present embodiment is not limited to that of FIG. 3. For example, the components of the battery pack 22 may be laid out in a reverse manner in the rightward and leftward direction.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

As described above, the battery pack for the electric vehicle of the present invention can achieve an advantage that the battery container can ensure required stiffness while providing insulation between the battery and the outside of the batteries, without increasing the thickness of the battery container, and is effectively applied to the electric utility vehicle and the like, which can achieve this advantage.

Specifically, the present invention is suitably applicable to a battery pack including a battery with a relatively heavy weight. For example, the present invention is applicable to battery packs incorporated into vehicles such as a two-wheeled vehicle, a truck, a golf cart, or personal watercraft. Or, the present invention is suitably applicable to a battery pack incorporated into a hybrid vehicle including an engine and a battery. In particular, the present invention is suitably applicable to a battery pack incorporated into a vehicle (e.g., vehicle which does not have a roof and is opened upward) which is capable of lifting up a battery pack from the vehicle.

REFERENCE CHARACTER LIST

1 electric utility vehicle (electric vehicle)
12 seat frame (vehicle body frame)
22 battery pack (battery pack)
30 battery case (battery container)
33 plug lid section (lid section)
40a A external frame unit
40a upper support section
40b lower support section
40c coupling section
41 protruding member (fastening section)
42 first fastening section
43 mounting section
44 second fastening section (fastening section)

The invention claimed is:

1. A battery pack for an electric vehicle, comprising:
a plurality of batteries which store electric power for activating the electric vehicle;
a single battery container which is made of an insulating resin and accommodates the plurality of batteries therein;
an external frame unit which surrounds a portion of an outer surface of the battery container and supports the battery container from below;
an internal frame unit which couples the plurality of batteries to each other to accommodate the batteries coupled to each other into the battery container,
wherein the external frame unit includes a lower support section placed on a lower surface of the battery container, an upper support section placed on an upper surface of the battery container, and a coupling section which is a flat plate member placed to conform in shape to a side surface of the battery container and coupling the lower support section and the upper support section to each other,
wherein the internal frame unit includes a retaining section which couples the plurality of batteries to each other and retains the plurality of batteries coupled to each other, and a battery support section placed on a lower surface of a battery assembly including the plurality of batteries coupled to each other by the retaining section to support the battery assembly from below,
wherein the battery support section is in surface contact with a bottom surface of an interior of the battery container in a plurality of locations.

2. The battery pack for the electric vehicle according to claim 1, wherein the external frame unit includes a second fastening section attached with a fastening member used to fasten the external frame unit to a vehicle body frame of the electric vehicle.

3. The battery pack for the electric vehicle according to claim 1,
wherein the battery container has an opening which is in communication with an interior of the battery container and a lid section which closes the opening, in a region which is not covered with the external frame unit, and
wherein a service plug, which cuts off an electric power supply from the battery placed in the interior of the battery container, is placed in a vicinity of the opening, in the interior of the battery container.

4. The battery pack for the electric vehicle according to claim 1,
wherein the upper support section of the external frame unit includes a mounting section used to removably mount, on the upper support section, a suspending unit for suspending the battery pack.

5. The battery pack for the electric vehicle according to claim 1,
wherein the battery container includes:
a case body section which is opened upward, and has an accommodating space of the batteries inside thereof;
a case lid section which closes an opening of the case body section; and
a fastening member by which an edge portion of the case lid section and an edge portion of the case body section, the edge portions overlapping with each other, are fastened to each other, and
wherein the battery container has a vertically dividable structure in which the case lid is provided over the case body section.

6. The battery pack for the electric vehicle according to claim 5,
wherein the case body section has:
a groove section which is recessed downward so as to surround an outer periphery of a bottom surface of the case body section, and
a drain port which is formed in a portion of the groove section and through which water accumulated in an interior of the battery container is discharged outside.

7. The battery pack for the electric vehicle according to claim 1,
wherein the upper support section of the external frame unit includes:
a plurality of elongated rod members extending in parallel with a lengthwise direction of the battery container; and
a plurality of reinforcement members placed between the plurality of elongated rod members to couple the elongated members to each other, and
wherein the upper support section has a ladder shape in which the plurality of reinforcement members are spaced a specified distance apart from each other.

8. The battery pack for the electric vehicle according to claim 7,
wherein the upper support section includes a plurality of protruding members placed to be spaced apart from each other, and protruding outward, in a forward and rearward direction of a vehicle body, from the elongated rod members.

9. The battery pack for the electric vehicle according to claim 8,
wherein each of the plurality of protruding members includes a first fastening section which is provided at a tip end portion thereof to couple the upper support section to the coupling section, and causes a hook of a suspending device for suspending the battery pack to be engaged with the upper support section.

10. The battery pack for the electric vehicle according to claim 1,
wherein the plurality of batteries are placed at an upper side and a lower side,
wherein the retaining section includes a coupling/retaining section which couples the batteries arranged horizontally to each other,
wherein the coupling/retaining section includes:
a first frame member covering the batteries placed at the upper side; and
a second frame member covering the batteries placed at the lower side, and
wherein the second frame member has a strength higher than that of the first frame member.

11. The battery pack for the electric vehicle according to claim 1,
wherein the retaining section includes an upper battery support section which is placed on upper surfaces of the plurality of batteries placed at an upper side, has a plurality of apertures, and couples the batteries placed at the upper side, in a location above the batteries placed at the upper side.

12. A battery pack for an electric vehicle, comprising:
a plurality of batteries which store electric power for activating the electric vehicle;
a single battery container which is made of an insulating resin and accommodates the plurality of batteries therein; and
an external frame unit which surrounds a portion of an outer surface of the battery container and supports the battery container from below,
wherein the external frame unit includes a lower support section placed on a lower surface of the battery container, an upper support section placed on an upper surface of the battery container, and a coupling section which is a flat plate member placed to conform in shape to a side surface of the battery container and coupling the lower support section and the upper support section to each other,
wherein the upper support section of the external frame unit includes:
a plurality of elongated rod members extending in parallel with a lengthwise direction of the battery container; and
a plurality of reinforcement members placed between the plurality of elongated rod members to couple the elongated members to each other, and
wherein the upper support section has a ladder shape in which the plurality of reinforcement members are spaced a specified distance apart from each other.

* * * * *